United States Patent

Yamada et al.

Patent Number: 5,400,178
Date of Patent: Mar. 21, 1995

[54] SCREEN UNIT FOR REAR PROJECTION PICTURE DISPLAY SYSTEM, METHOD FOR PRODUCING THE SAME AND COMPONENT TO BE USED FOR ASSEMBLING THE SCREEN UNIT

[75] Inventors: Tadayoshi Yamada, Osaka; Katsumi Goto, Takatsuki; Matsuo Ochi, Kameoka; Tsuyoshi Shimatani, Kyoto; Yoshinobu Maeda, Katano, all of Japan

[73] Assignee: Matsushita Electric Industrial Co., Ltd., Kadoma, Japan

[21] Appl. No.: 996,813

[22] Filed: Dec. 23, 1992

[30] Foreign Application Priority Data

Dec. 27, 1991 [JP] Japan ............... 3-346109

[51] Int. Cl.[6] ..................................... G03B 21/56
[52] U.S. Cl. ........................... 359/449; 359/443; 359/451; 359/457
[58] Field of Search ............... 359/443, 451, 457, 449

[56] References Cited

U.S. PATENT DOCUMENTS

| | | | |
|---|---|---|---|
| 4,318,589 | 3/1982 | Brown et al. | 359/451 |
| 4,750,807 | 6/1988 | Chamayou Dit Felix | 359/451 |
| 4,895,429 | 1/1990 | Iwahara et al. | 359/450 |
| 4,984,871 | 1/1991 | Martinez | 359/443 |
| 5,011,277 | 4/1991 | Ogino et al. | 353/94 |
| 5,103,339 | 4/1992 | Broome | 359/443 |
| 5,206,760 | 4/1993 | Nakashima et al. | 359/457 |

FOREIGN PATENT DOCUMENTS

| | | |
|---|---|---|
| 3073938 | 3/1991 | Japan . |
| 3137625 | 3/1991 | Japan . |
| 3101247 | 10/1991 | Japan . |

*Primary Examiner*—Richard A. Wintercorn

[57] ABSTRACT

A rear projection screen unit in a large-size picture display system, composed by combining a plurality of rear projection screen panels arranged in a lattice square with at least one ordinate and abscissa beams disposed between the adjacent screen panels, wherein each of said screen panels intersects with each of said beams which themselves intersect with each other to form the lattice square, and each of said screen panels and ordinate and abscissa beams are connected together by a multiple mortise-and-tenon joint. The lattice square is installed in a outer frame and stressed in the four directions by a resilient members provided on the outer frame. The disclosed structure has minimized the width of the non-effective area in the screen unit, and realized a high reliability in installing strength of the respective screen panels in an integral body suitable for the large-size picture display system.

21 Claims, 12 Drawing Sheets

FIG. 3A
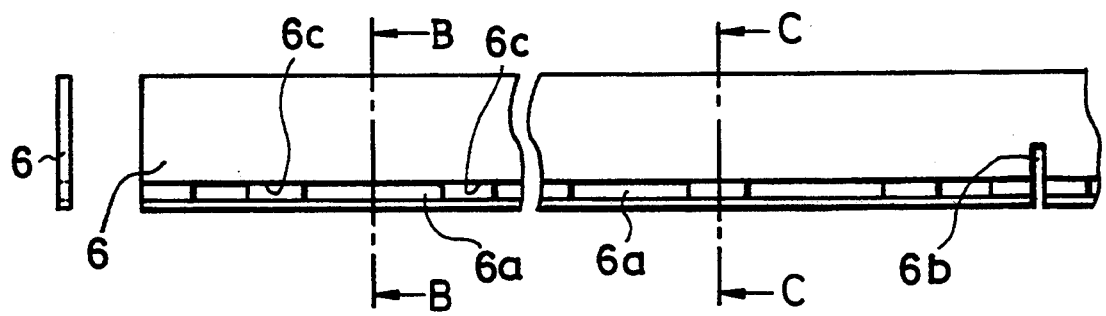
FIG. 3B  FIG. 3C  FIG. 3D
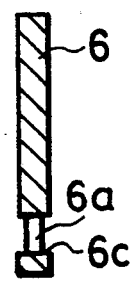 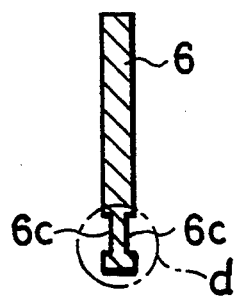 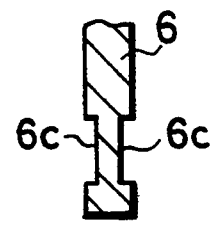
FIG. 4
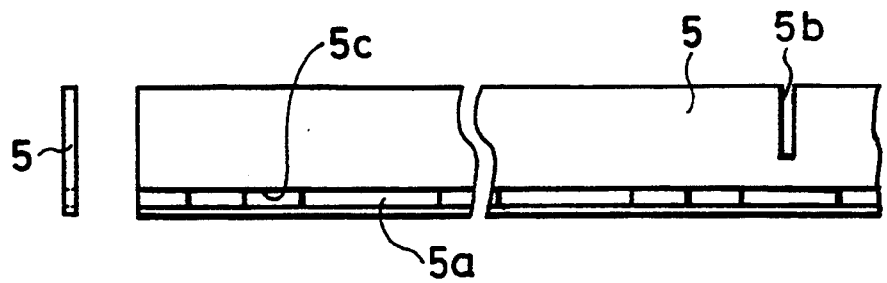

FIG.14A (Prior Art)
FIG.14B (Prior Art)
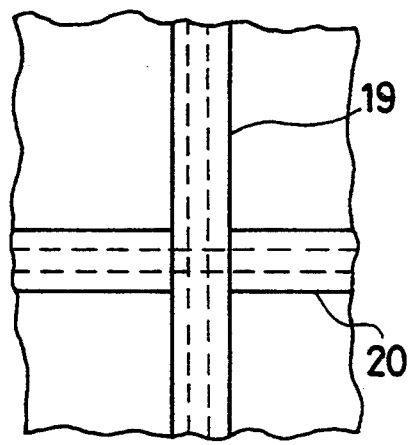
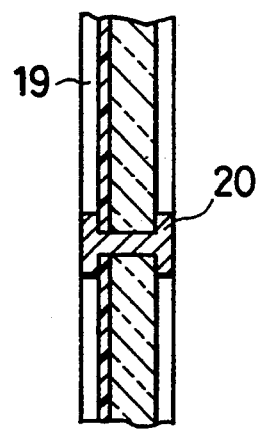
FIG.14C (Prior Art)
FIG.14D (Prior Art)
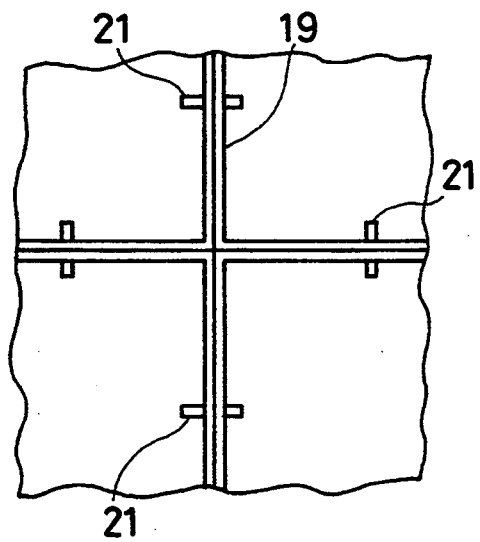
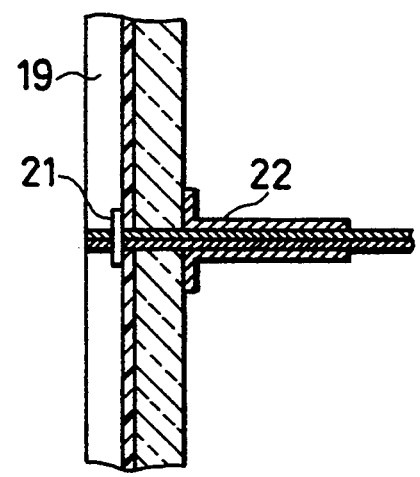
FIG.14E (Prior Art)
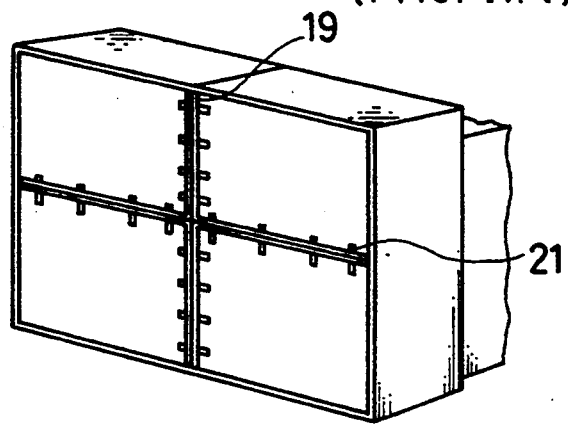

SCREEN UNIT FOR REAR PROJECTION PICTURE DISPLAY SYSTEM, METHOD FOR PRODUCING THE SAME AND COMPONENT TO BE USED FOR ASSEMBLING THE SCREEN UNIT

FIELD OF THE INVENTION AND RELATED ART STATEMENT

1. Field of the Invention

The present invention relates to a screen unit for use in a large-size picture display system composed by combining a plurality of rear projection screen panels arranged in a lattice square, with a plurality of video image projectors.

2. Description of The Prior Art

In recent years, there has been proposed various screen units for the large-size picture display apparatus, each composed by combining a plurality of rear projection screen panels arranged in a lattice square, with a plurality of video image projectors, for projecting video image of the signal supplied by a signal source such as television receiver, video tape recorder or the like.

In the case of combining a plurality of rear projection screens to complete an integral body of the lattice square or a matrix, there is however a disadvantage in that no optical image is displayed on the non-effective areas in strips extended along the joining lines of the respective screen panels. Namely, the structure of the prior art screen unit can be exemplified by one configured by combining a plurality of screen panels 19, with a plurality of joining members of I-cross-section 20 for accommodating the joining edges of the respective screen panels, as shown by FIG. 14A and FIG. 14B, one configured by combining a plurality of screen panels 19, with a plurality of flanged joining members 22 for supporting the screen panels 19 at their rear face as well as a plurality of stop wedges 21, each of which intersect the joining members 22 at their parts exposed in front of the screen panels 19, as shown by FIG. 14C and FIG. 14D.

In the first exemplified structure shown in FIGS. 14A, 14B, however, the parts of the I-cross-section joining member 19, 20 exposed in front of the screen panels create the non-effective strips in a lattice square form having a width of from several millimeters to ten and several millimeter. In the second exemplified structure shown in FIGS. 14C, 14D, the stop wedges 21 create a number of non-effective spots in front of the assembled screen unit as shown by FIG. 14E. In this manner, the prior art structures for the screen unit have the disadvantage in that the whole picture is divided into a plurality of fragmentary pictures by the thick members in the lattice structure, or in that the picture quality is degraded by the ugly stained spots dispersed elsewhere in the picture.

As above-mentioned, in case of arranging a large-size screen unit by combining a plurality of rear projection screen panels, it is required to minimize the non-effective areas or the ugly stained spots attributable to the joining structures and, at the same time to means for maintaining the reliability for the installation of the screen panels. For the concurrent attainment for both requirements which are incompatible with each other, various proposals for the installation of the screen panels have hitherto been proposed.

A structure of fixing a plurality of screen panels to a housing with a plurality of springs and thin rods has been disclosed in Tokkai Hei (Japanese Unexamined Patent Publication) 3-73,938, and the like. In the structure of fixing the plurality of the screen panels arranged in a square by the spring means disclosed in Tokkai Hei 3-73,938, it is however difficult to fix the screen panels at their joining parts by the spring means, and thus only their peripheral parts adjacent to the outer frame of the housing can be fixed by the tension of the spring members. Therefore, separate metal members have to be used for supporting the central parts of the screen panels and the non-effective areas of the screen unit occupied by the metal members cannot be minimized beyond a certain limit.

Another structure for minimizing the non-effective area extended along the joining lines between the adjacent screen panels is disclosed in Jikkai Hei (Japanese Unexamined Utility Model Publication) 3-101.247. The disclosed structure comprises a use of sealing members of a non-transmitting material placed at the joining lines between the adjacent screen panels for shielding the leaked light from the individual projectors. Although the disclosed structure can minimize the non-effective areas along the adjoining lines. It is difficult to maintain a reliability in the installation of the screen panels.

In the above-mentioned prior art structures for the screen unit, the above-mentioned requirement for use in the large size picture display system has not yet been fulfilled, and thus the disadvantage has not completely been overcome.

OBJECTS AND SUMMARY OF THE INVENTION

The present invention is proposed in order to overcome the above-mentioned disadvantages inherent to the prior art apparatus, and has, as its object, the provision of a screen unit for the large-size picture display system, which is sufficient in practical use.

It is another object of the present invention to provide a method for producing the above-mentioned screen unit.

It is a still another object of the present invention to provide a joining member used in assembling the above-mentioned screen unit.

In accordance with the present invention, there is provided a rear projection screen unit in a large-size picture display system, composed by combining a plurality of rear projection screen panels arranged in a lattice square with at least one ordinate beam and at least one abscissa beam disposed between the adjacent screen panels, wherein each of said screen panels intersects with each of said beams which themselves intersect with each other to form the lattice square, comprising:

a plurality of tenons provided on the side edges of each of said screen panels that face said beams, and arranged in a row;

a plurality of mortises provided in a row on both surfaces of said beams that face said side edges of each of said screen panels, and arranged in a row that coincides with said row of said tenons; and at least one reflection preventing colored layers deposited on the surfaces of said side edges of said screen panels including said tenons that face said beams; wherein, each of said mortises accommodates each of said tenons of said screen panels that fits in each of said mortises for forming a multiple mortise-and-tenon joint between said screen panels and ordinate and abscissa beams.

In the above-mentioned rear projection screen unit, each of said beams preferably has a thickness which is approximately the same as that of twice the heights of said tenons plus the thickness of said reflection preventing colored layers, and each of the tops of said tenons on the side edges of said screen panels may be deposited with an adhesive layer to connect itself with the corresponding top of each of the tenons on the side edges of said screen panels.

In the above-mentioned rear projection screen unit, each of said beams may be made of a material that is substantially the same as that of said screen panels.

In the above-mentioned rear projection screen unit, each of said ordinate and abscissa beams preferably has at least one indent of the width and depth sufficient for accommodating the intersecting beams at similarly indented spot, and both of said ordinate and abscissa beams may form a lattice structure when combined together by interlocking joint.

In the above-mentioned rear projection screen unit, each of said screen panels may comprises a laminated body composed preferably of a lenticular lens sheet and a frensnel lens sheet.

In the above-mentioned rear projection screen unit, each of said beams may be made of a metal and has a thickness smaller than twice the heights of said tenons plus the thickness of said reflection preventing colored layers.

The above-mentioned rear projection screen unit may further comprises a U-cross section outer frame member which preferably encompasses said lattice square composed of said screen panels and said ordinate and abscissa beams.

In the above-mentioned rear projection screen unit, the outer edges of said screen panels may be closely fit in the inward grooves formed along said U-cross section outer frame member.

The above-mentioned rear projection screen unit may further comprises at least one resilient material member placed in the inward grooves formed along said U-cross-section outer frame member, in a manner that said screen panels may be urged inwards by said resilient member that gives a stress on said screen panels toward the center of the lattice square. Said resilient member may be a metal leaf spring or may be made of rubber or rubbery resinous material.

The above-mentioned rear projection screen unit may further comprises a reflection preventing colored layer deposited in the inside surfaces of said inward groove of said outer frame member.

In the above-mentioned rear projection screen unit, the width of each tenons may alternately be much smaller than the space between the tenons, and the row of said tenons of one of said screen panels may be staggered with respect to the row of said tenons of the adjacent screen panels in a manner that the tenons in the first-mentioned row can be accommodated by the row of the spaces between the tenons in the second mentioned row on the other of said screen panels, for forming a multiple mortise-and-tenon joint between adjacent said screen panels and sandwiching said ordinate and abscissa beams, through said mortises provided on said beams whose thickness is approximately the same as that of said tenons.

In accordance with another aspect of the present invention, there is provided a method for forming a rear projection screen unit panels in a large-size picture display apparatus composed by combining a plurality of rear projection screen panels arranged in a lattice square with at least one ordinate beam and at least one abscissa beam disposed between the adjacent unit screens, wherein each of said screen panels intersects with each of said beams which themselves intersect with each other: comprising:

providing a row of a plurality of tenons on the side edges of each of said screen panels that face said beams;

providing a plurality of mortises on both surfaces of said beams that face said side edges of each of said screen panels, disposed in a row that coincides with said row of said tenons;

depositing at least one reflection preventing colored layers on said side edges including said tenons of said screen panels that face said beams;

depositing an adhesive layer on each of the tops of said tenons on said screen panels; and assembling said screen panels and said beams in the lattice square by inserting said tenons into said mortises for forming a multiple mortise-and-tenon joint between said screen panels and ordinate and abscissa beams.

In the above-mentioned method, the widths of the mortises nearest to a point whereat both the ordinate and abscissa beams intersect with each other may be smaller than those of the rest of the mortises.

In accordance with the further aspect of the present invention, there is provided beams for assembling a rear projection screen unit panels in a large-size picture display apparatus, composed by arranging a plurality of rear projection screen panels which has, on their joining edges, a row of a plurality of tenons with adhesive layers on their tops, in a lattice square, comprising:

at least one ordinate beam having a row of mortises, each of which is adapted to accommodate each of said tenons: and at least one abscissa beam having a row of mortises, each of which is adapted to accommodate each of said tenons, wherein; both of said beams have at least one indent at which one of said beams intersects with the other by fitting them in the indent of the counterpart. In the above-mentioned beams, for supporting the screen panels each composed by laminating a lenticular lens sheet and a frensnel lens sheet, each of the ordinate and abscissa beams may have grooves which connects said row of mortises in its both surfaces, having a width and depth sufficient for supporting the joining edges of the screen panels.

The above mentioned beams may further comprises; at least one adhesive layer deposited on the part that faces with each of the joining edges of said screen panels.

Further, the beams may comprises; at least one reflection preventing colored layer deposited on the part that faces with each of the joining edges of said screen panels.

The above-mentioned beams may be made of a metal and preferably having a thickness smaller than twice the heights of said tenons, and may alternately be made of a material having a coefficient of thermal expansion which is approximately the same as that of the screen panels.

As shown in the above-mentioned configuration, the present invention has minimized the width of the noneffective areas extended along the joining lines of the respective screen panels, and has divided the joining line between the adjacent screen panels into a multiplicity of tenons and spaces between the tenons, so as to connect the adjacent screen panels along the multiplicity of tenons and spaces. By doing so, the differences in the thermal expansions and contractions of the screen panels and the cross members attributable to the difference in the coefficients of thermal expansion can be divided into the multiplicity of the respective minute parts. In this way, the absolute distances in the shifts of the respective parts with respect to the adjacent parts attributable to the differences in the thermal expansions and contractions are also minimized.

As has been mentioned in the above and as will be seen from the following detailed description of the preferred embodiments, any such problem of rip-off of the adhesion produced by the temperature variance is solved in the above-mentioned manner, and thus the structure can sufficiently maintain the reliability in the installation of the respective screen panels, and can provide the screen unit most suitable for the large-size picture display system.

In the event of employing the members made of a metal as the beams, the present invention can provide an excellent structure that can prevent the distortion such as bend of the respective screen panels and the rip-off of adhesion parts which may be produced by the differences in the thermal expansion and contraction of the beams and the screen panels attributable to the difference in the coefficients of thermal expansion of both components.

Further, it is also possible to realize the light weight screen unit, by making the thickness of each of the beams used for connecting a multiplicity of the rear projection screen panels the approximately the same as those of the screen panels. In addition to this, it is possible to provide the screen unit for the large-size picture display system that is suitable for mass production, by employing the beams made of a resinous material of the same type as that of the screen panels.

While the novel features of the present invention are set forth particularly in the appended claims, the invention, both as to organization and content, will be better understood and appreciated, along with other objects and features thereof, from the following detailed description taken in conjunction with the attached drawings.

BRIEF DESCRIPTION OF THE DRAWINGS

FIG. 3A is a side view of the abscissa beam of the screen unit of the embodiment shown in FIG. 1, with an end view of the same at the left extreme.

FIG. 3B is a side cross-sectional view of the abscissa beam, cut along the plane B—B in FIG. 3A.

FIG. 3C is a side cross-sectional view of the abscissa beam cut along the plane C—C in FIG. 3A.

FIG. 3D is an enlarged view of the encircled part of FIG. 3C.

FIG. 4 is a side view of the ordinate beam of the screen unit of the embodiment shown in FIG. 1, with an end view of the same at the left extreme.

FIG. 14A is a front view of the prior art screen unit.

FIG. 14B is a side cross-sectional view of the screen unit shown in FIG. 14B.

FIG. 14C is a front view of the other prior art screen unit.

FIG. 14D is a side cross-sectional view of the screen unit shown in FIG. 14C.

FIG. 14E is a perspective view showing the whole structure including the screen unit shown in FIGS. 14C and 14D.

DESCRIPTION OF THE PREFERRED EMBODIMENT

Figure 1:
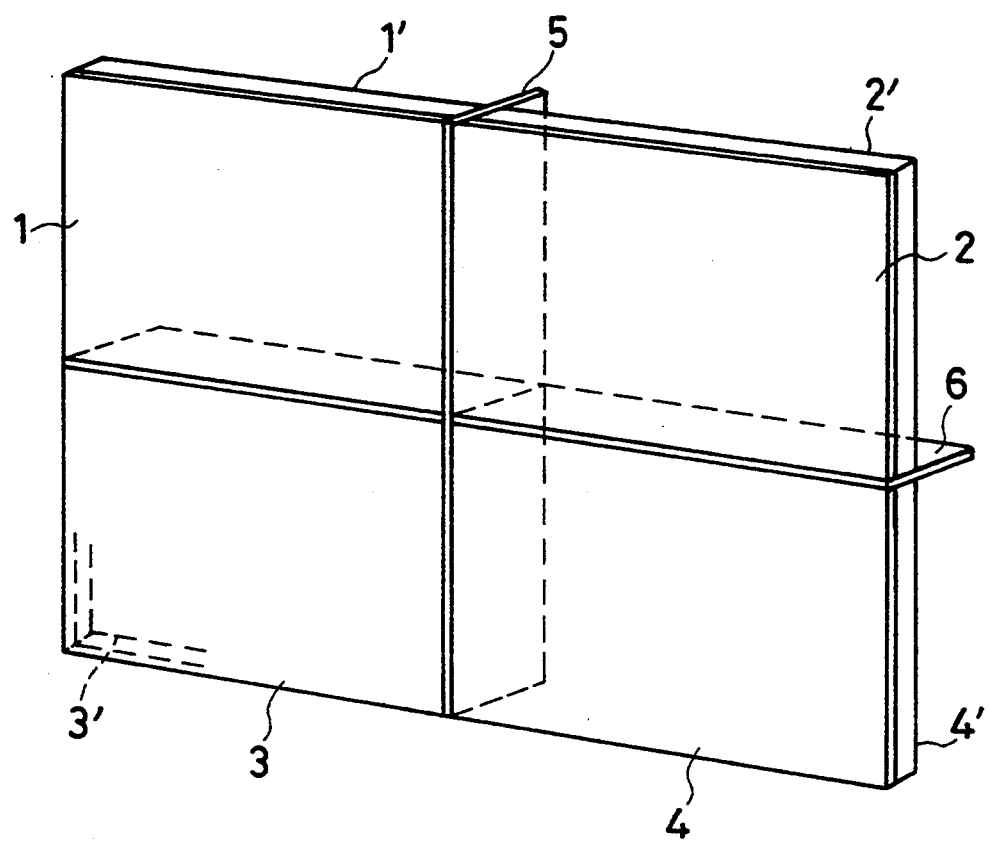
FIG. 1 is a perspective view of the screen unit built in accordance with an embodiment of the present invention.

In the following paragraphs, one of the preferred embodiments of the present invention will be described with reference to FIGS. 1 through 12 of the attached drawings.

The screen unit of the present embodiment comprises a plurality of (in this embodiment, four) rear projection screen panels 1, 1', 2, 2', 3, 3' and 4, 4' arranged in a lattice square, an ordinate or vertical beam 5, an abscissa or horizontal beam 6, and U-cross-section outer frame members 9 and 10 (see, FIGS. 8–11). Each of the rear projection screen panels is usually an integral body composed by laminating a lenticular lens sheet 1, 2, 3 or 4 over a frensnel lens sheet 1', 2'3' or 4'. A large-size picture display system is structured by combining each of the above-mentioned rear projection screen panels with each of the unit projectors 17 as well as each of the reflection mirrors 18, assembled in the lattice square as specifically shown by FIG. 12.

Figure 2:
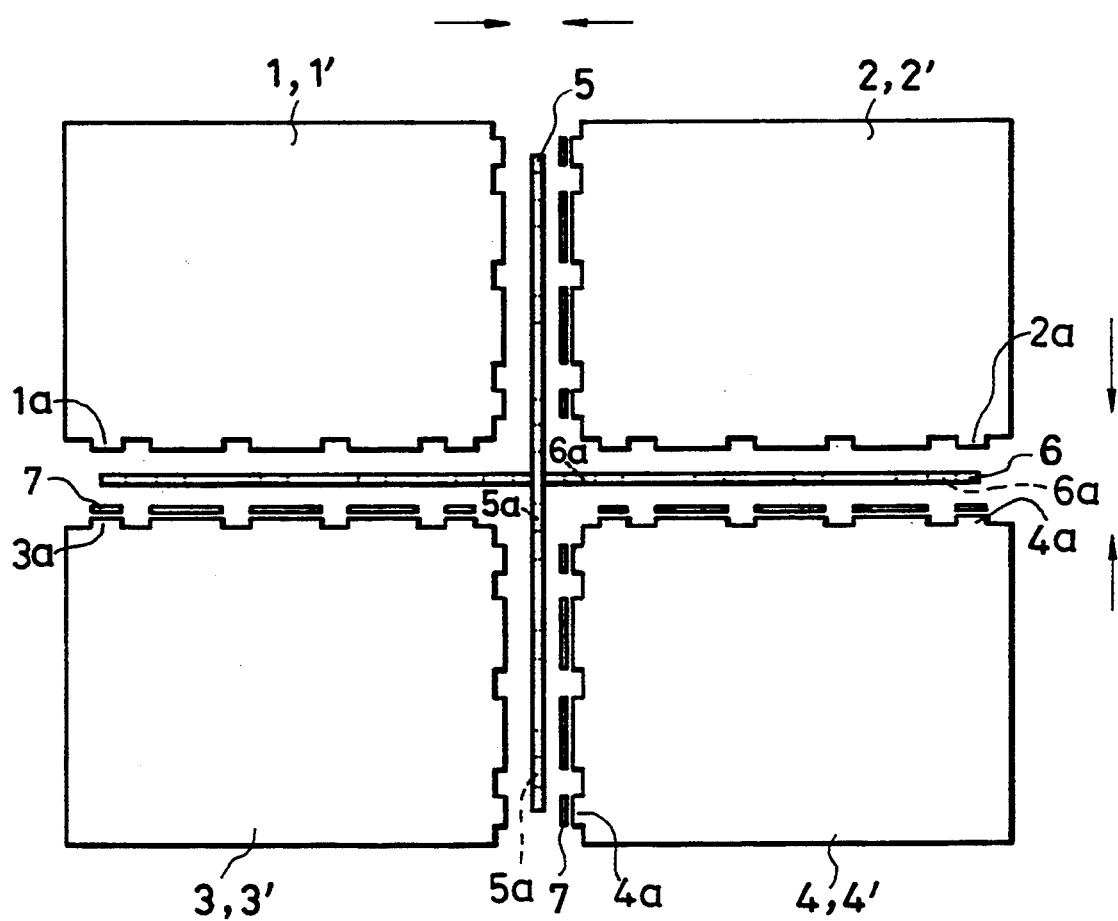
FIG. 2 is an exploded front view of the screen unit built in accordance with the embodiment shown in FIG. 1, for illustrating the relationship between the respective screen panels and the cross members.

An exploded front view of FIG. 2 illustrates the relationship between the respective screen panels and the beams and the manner of joining the screen panels with the beams. Along the edges of the respective screen panels 1, 1', 2, 2', 3, 3' and 4, 4' facing the beams 5 and 6, there are provided a plurality of tenons 1a, 1b, 2a, 2b, 3a, 3b and 4a, 4b in rows which are in linear symmetry with respect to the beams 5 and 6. On tops of the respective tenons on at least one of the facing edges of the screen panels, there are provided adhesive layers 7. The beams 5 and 6 are preferably made of metal.

As shown in FIGS. 3 and 4, each of the ordinate beam 5 and abscissa beam 6 is provided with an indent 5b or 6b having the width and depth sufficient for accommodating the the counterpart beam 6 or 5 at its mid part, in a manner that one can interlock the other at its indent so as to fit itself in the other's indent and to form an intersecting structure for supporting the screen panels 1, 2, 3 and 4, arranged in a matrix. Both of the ordinate beam 5 and abscissa beam 6 are provided with a plurality of through mortises 5a and 6a, adapted to accommodate the tenons 1a, 2a, 3a and 4a on the edges of the screen panels. On both sides of each of the beams 5 and 6, there are provided grooves 5c and 6c for connecting its row of the mortises and can accommodate the edges of the screen panels at their space between their tenons. Each of the parts of the beams 5 and 6 that corresponds to the tenons 1a through 4a on the edges of the screen panel is shaped to have a cross-section along the plane B—B shown by FIG. 3B. Each of the parts of the beams 5 and 6 that corresponds to a space between the tenons 1a through 4a of the screen panel is shaped to have a cross-section along the plane C—C shown in FIG. 3C.

The front view of FIG. 3A shows the abscissa beam 6 (disposed in the lengthwise direction of the screen unit) while the front view of FIG. 4 shows the ordinate beam 5 (disposed in the breadth direction of the screen unit). At the left extremes of FIGS. 3A and 4, there are shown end views of the abscissa beam 6 and ordinate beam 5, respectively.

Figure 5A:
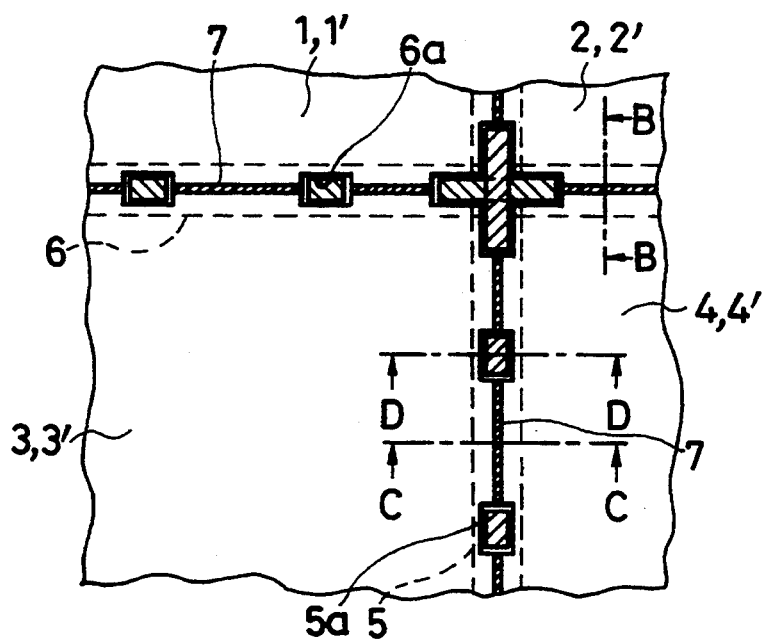
FIG. 5A is a partly cross-sectional front view of the central part of the screen unit of the embodiment shown in FIG. 1, cut along the plane A—A of FIG. 5B.
Figure 5B:
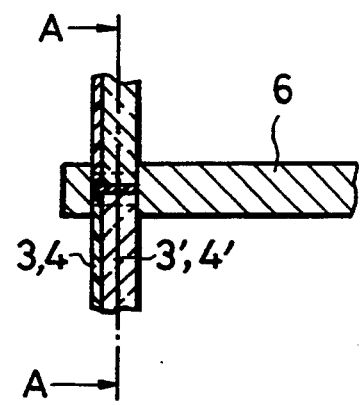
FIG. 5B is a side cross-sectional view of the screen unit cut along the plane B—B of FIG. 5A.

FIG. 5A is a partly cross-sectional front view for illustrating the joining state of the screen panels 1, 1', 2, 2', 3, 3' and 4, 4' and the beams 5 and 6. As is clearly seen from this figure, the widths of the through mortises 5a and 6a, that are nearest to the interlocking part of both beams 5 and 6, are smaller than the widths of the rest of the through mortises.

Figure 5C:
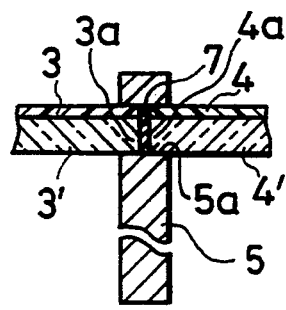
FIG. 5C is a side cross-sectional view of the screen unit cut along the plane C—C of FIG. 5A.

The side cross-sectional view shown in FIG. 5C, which is cut along the plane C—C of FIG. 5A, illustrates a state of the screen unit wherein both the tenons 3a and 4a are accommodated in the through mortise 5a of the ordinate beam 5 and joining together through the adhesive layer 7, such as an adhesive tape.

Figure 5D:
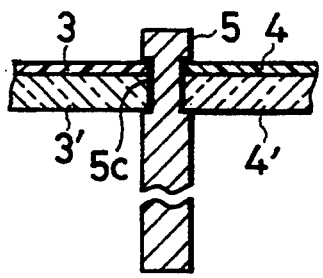
FIG. 5D is a side cross-sectional view of the screen unit cut along the plane D—D of FIG. 5A.

The side cross-sectional view shown in FIG. 5D, which is cut along the plane D—D of FIG. 5A, illustrate a state of the screen unit wherein the spaces between the tenons 3a and 4a are engaging with a groove 6c formed between the mortises 5a.

Figure 6:
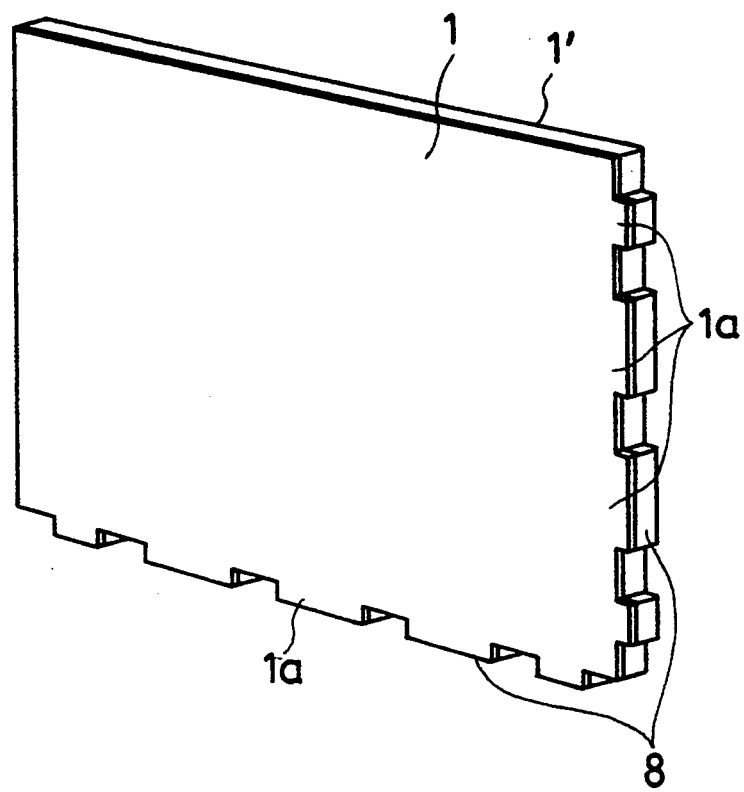
FIG. 6 is a perspective view of one of the screen panel in the screen unit of the embodiment shown in FIG. 1.
Figure 7:
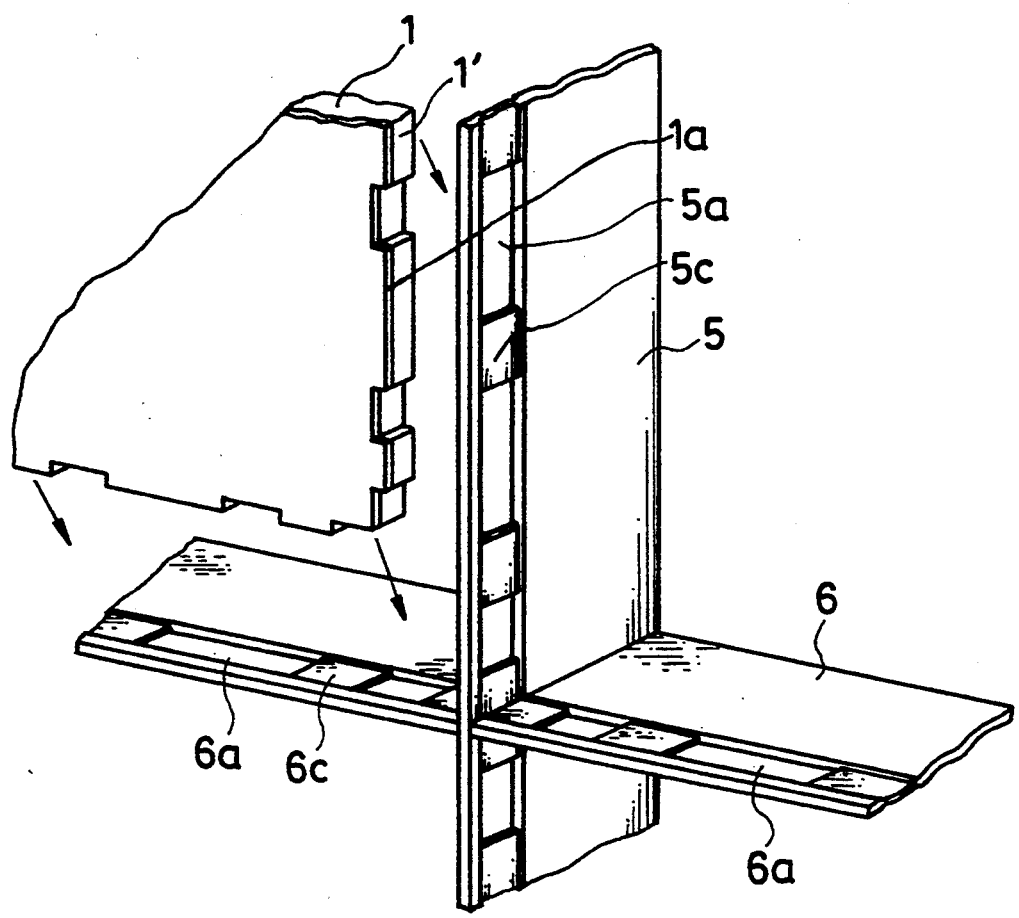
FIG. 7 is a perspective view for illustrating the manner of combining one of the screen panels with the respective cross members of the screen unit of the embodiment shown in FIG. 1.

The edges of the screen panels 1, 1', 2, 2', 3, 3' and 4, 4' are coated with a reflection preventing colored (e.g. black) layers 8 as shown by the perspective view in FIG. 6 showing the screen panel 1 and 1' as a representative. On the tops of the respective tenons 1a, 2a, 3a or 4a on at least one of the facing edges of the screen panels 1, 1', 2, 2', 3, 3' or 4, 4', there are provided the adhesive layers 7. The perspective view of FIG. 7 illustrates the joining relationships among one of the screen panels 1, 1', the ordinate and abscissa beams 5 and 6 at the time of assembly.

As shown in the above, the plurality of the rear projection screen panels 1, 1', 2, 2', 3, 3' and 4, 4' are combined together through the beams 5 and 6 by a multiple mortise-and tenon joint. Therefore, in the event that the coefficient of thermal expansion of the rear projection screen panels is different from that of the beams 5 and 6 of metal, it is required to eliminate adverse effect of the differences in the thermal expansion and contraction attributable to the differences in the coefficient of thermal expansion. This is made by providing clearances between the spaces of the tenons on the edges of the rear projection screen panels and those between the mortises in the metal beams. By filling the clearances with resilient member made of adhesive material and by directly connecting each of the tops of the tenons on the edges of the rear projection screen panels together, a connecting strength which is sufficient in practical use can be obtained at each of the joining spots. In this case, by configuring each of the tenons on the edges of the rear projection screen panels to have a larger width than the width of each of the spaces between the tenons, the areas of the direct joining spots can be enlarged and thus the connecting strength between the rear projection screen panels can further be enhanced.

In the event that the beams made of a material having approximately the same coefficient of thermal expansion as that held by the rear projection screen panels are employed, since any difference in the thermal expansion and contraction does not occur between the rear projection screen panels and the beams, it is possible to assemble the rear projection screen panels and the beams in closely touching relationship without any clearance, even in the spaces between the tenons on the edges of the rear projection screen panels.

Figure 8A:
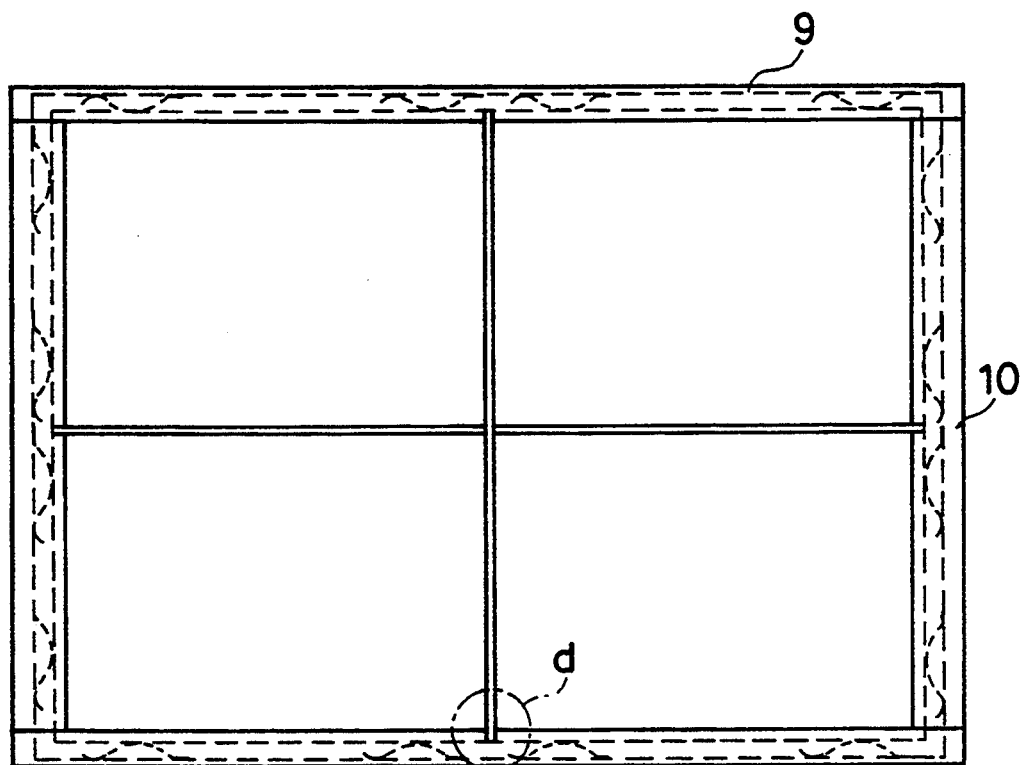
FIG. 8A is a front view of the screen unit of the embodiment shown in FIG. 1 with the outer frame members.
Figure 8B:
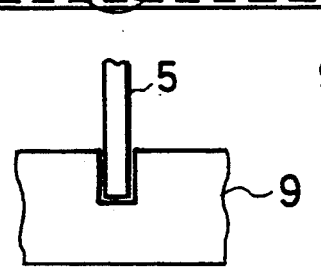
FIG. 8B is an enlarged view of the encircled part of FIG. 8A showing the relationship between a part of one of the frame members and one of the cross members.

The front view of FIG. 8A illustrates a completed screen unit, which employs metal components as the U-cross-section outer frame member for supporting the integral body composed of the rear projection screen panels and the beams, wherein the outer periphery of the integral body, the bottom of the inward grooves formed along the U-cross-section outer frame members 9 and 10 as well as a plurality of metal leaf springs 11 provided in the inward grooves in the clearance of e.g. 4–5 mm between the peripheries of the rear projection screen panels and the bottoms of the inward grooves are depicted by the broken lines. As specifically shown in the enlarged view of FIG. 8B, the ends of the cross members are accommodated in the indents provided on the U-cross-section outer frame members. The relationship between metal leaf springs 11 and the U-cross-section outer frame member 9, as well as that between metal leaf springs 11 and the screen panel are specifically shown by the side cross-sectional view shown in FIG. 9A. This configuration permits to eliminate adverse effect of the difference in the thermal expansion and contraction between the rear projection screen panels and the outer frame members 9 and 10, produced by the difference in the coefficient of thermal expansions between the screen panels and the outer frame member. It is also capable of performing the sure fitting-in operation of the screen panels to the inward groove formed along the U-cross-section outer frame members 9 and 10. By fixing the horizontal or abscissa outer frame member 9 to the vertical or ordinate outer frame member 10 by bolts 12, at the four corners of the outer frame as specifically shown by FIG. 9B, the screen unit is completed as shown by FIG. 8A.

Each of the metal leaf springs 11 creates a stress in each of the directions along the edges of the rear projection screen panels when the ordinate outer frame member 9 in the outer frame is secured into the abscissa member 10 of the outer frame by screwing the bolt 12. The total combination of the created stresses makes the fit-in supporting of the outer frame for the integral body of the rear projection screen panels and the beams sure. Adverse effect of difference in the thermal expansion and contraction of the rear projection screen panels and of the metal outer frame attributable to the differences in the coefficient of thermal expansion can be eliminated by resilience of the metal leaf spring 11. In this way, the metal leaf spring prevents a possible bend as well as a possible distortion of the screen panels. Further, by the provision of the metal leaf springs, a state wherein the stresses are always centering to the joining lines of the screen panels is maintained, and hence the connections between each of the edges of the screen panels are maintained in a strong adhesion, there is no such occasion of rip-off of the adhesion parts and a rear projection screen unit of high reliability can be configured.

Figure 9A:
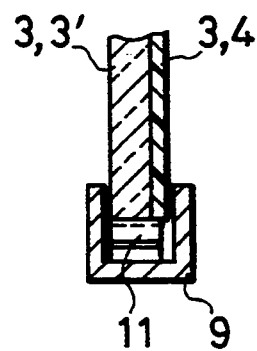
FIG. 9A is a side cross-sectional view of an outer edge of the screen panel and the outer frame member.
Figure 9B:
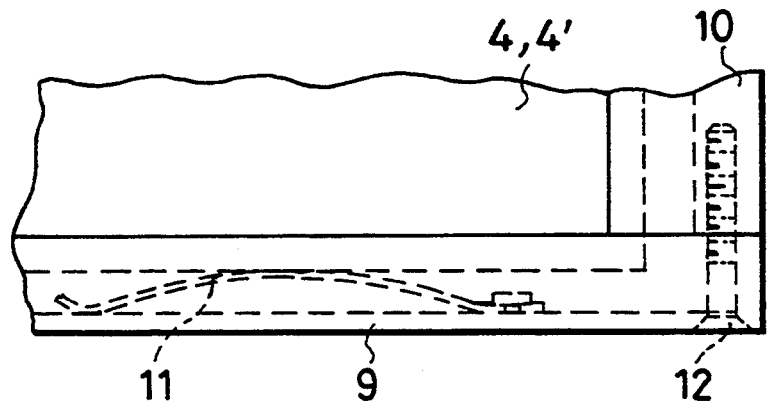
FIG. 9B is a front view illustrating a corner of the outer frame members and the resilient leaf spring.

Apart from the metal leaf spring 11 shown in FIGS. 8A, 9A and 9B, a coil spring can be employed in lieu of the leaf spring. And further, the resilient member can be structured with any resilient material such as resinous spring, resinous rubber and the like.

Figure 10A:
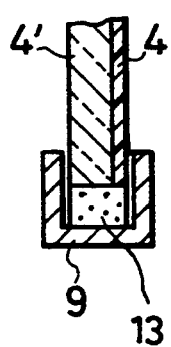
FIG. 10A is a side cross-sectional view of an outer edge of the screen panel and the outer frame member.
Figure 10B:
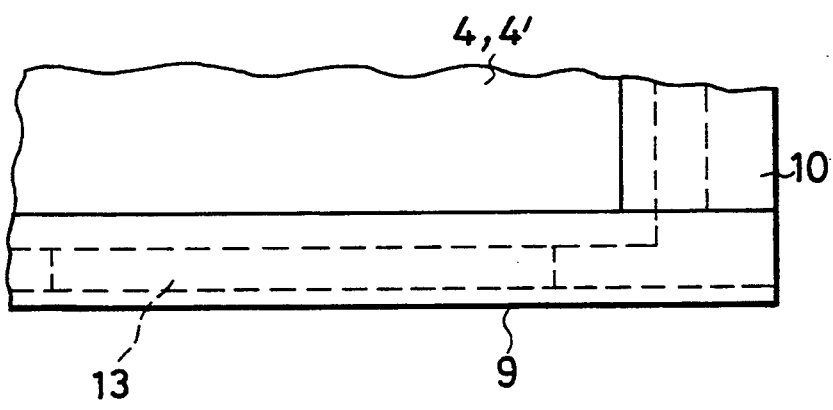
FIG. 10B is a front view illustrating a corner of the outer frame members and the resilient resinous material.

The side cross-sectional view of FIG. 10A illustrates a relationship between the screen panel 4, 4' and the resilient member 13 made of rubber and that between the rubber member 13 and the abscissa outer frame member 9. And, the front view of FIG. 10B illustrates a corner of the intersecting outer frame members 9 and 10, wherein the outer peripheries of the screen panel 4, 4', the rubber member 13 and the bottom of the inward groove provided on the U-cross-section outer frame members 9 and 10 are depicted by the broken lines.

Figure 11A:
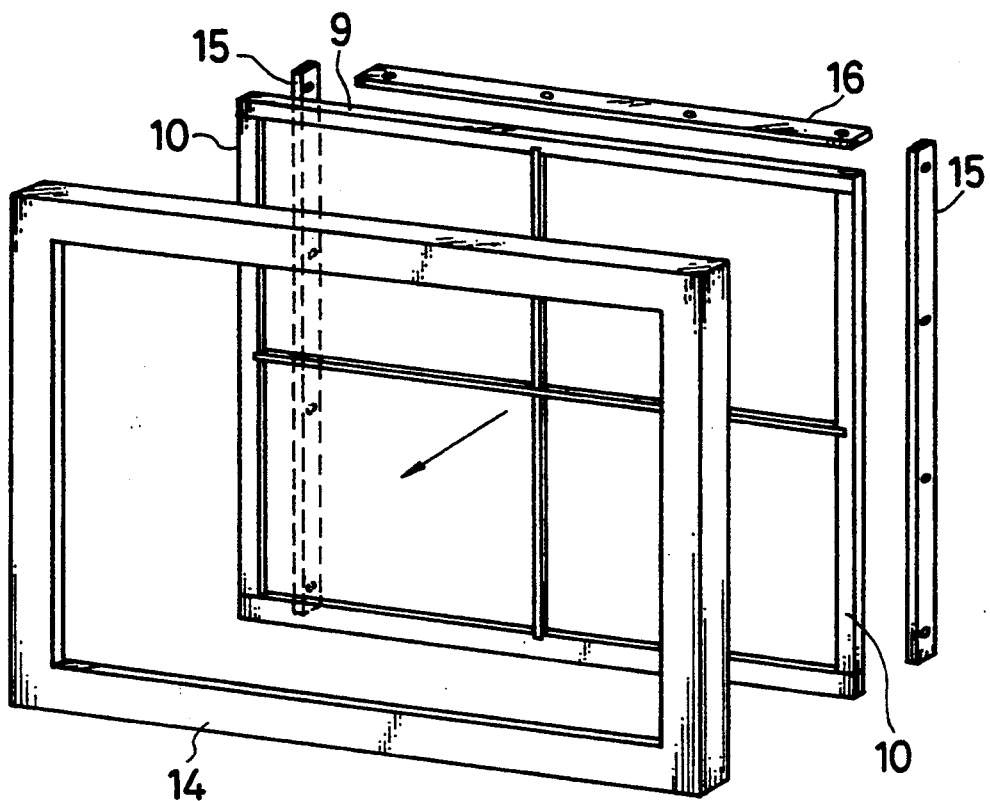
FIG. 11A is an exploded perspective showing a structure of the screen unit composed of four screen panels, beams, outer frame members, ornamental frame as well as supporting members.
Figure 11B:
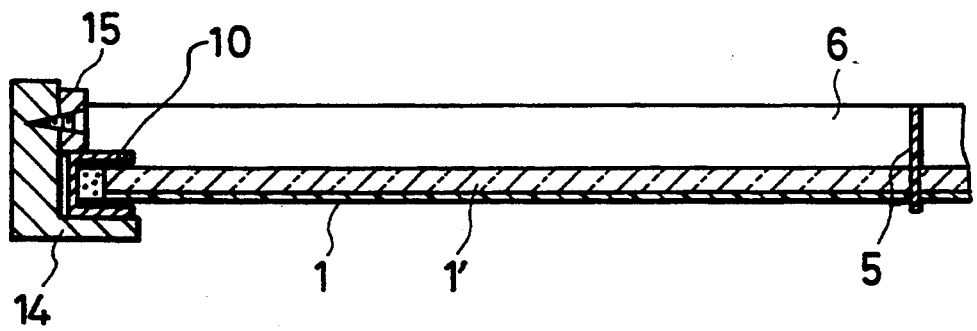
FIG. 11B is a side cross-sectional view of the part of the screen unit shown in FIG. 11A.

The exploded perspective view of FIG. 11A illustrates a manner of assembling the completed screen unit composed of the four rear projection screen panels and the beams with an ornamental frame 14 together with backing members 15–16, and the top cross-sectional view of FIG. 11B illustrates a part of the assembled state of the same.

Figure 12:
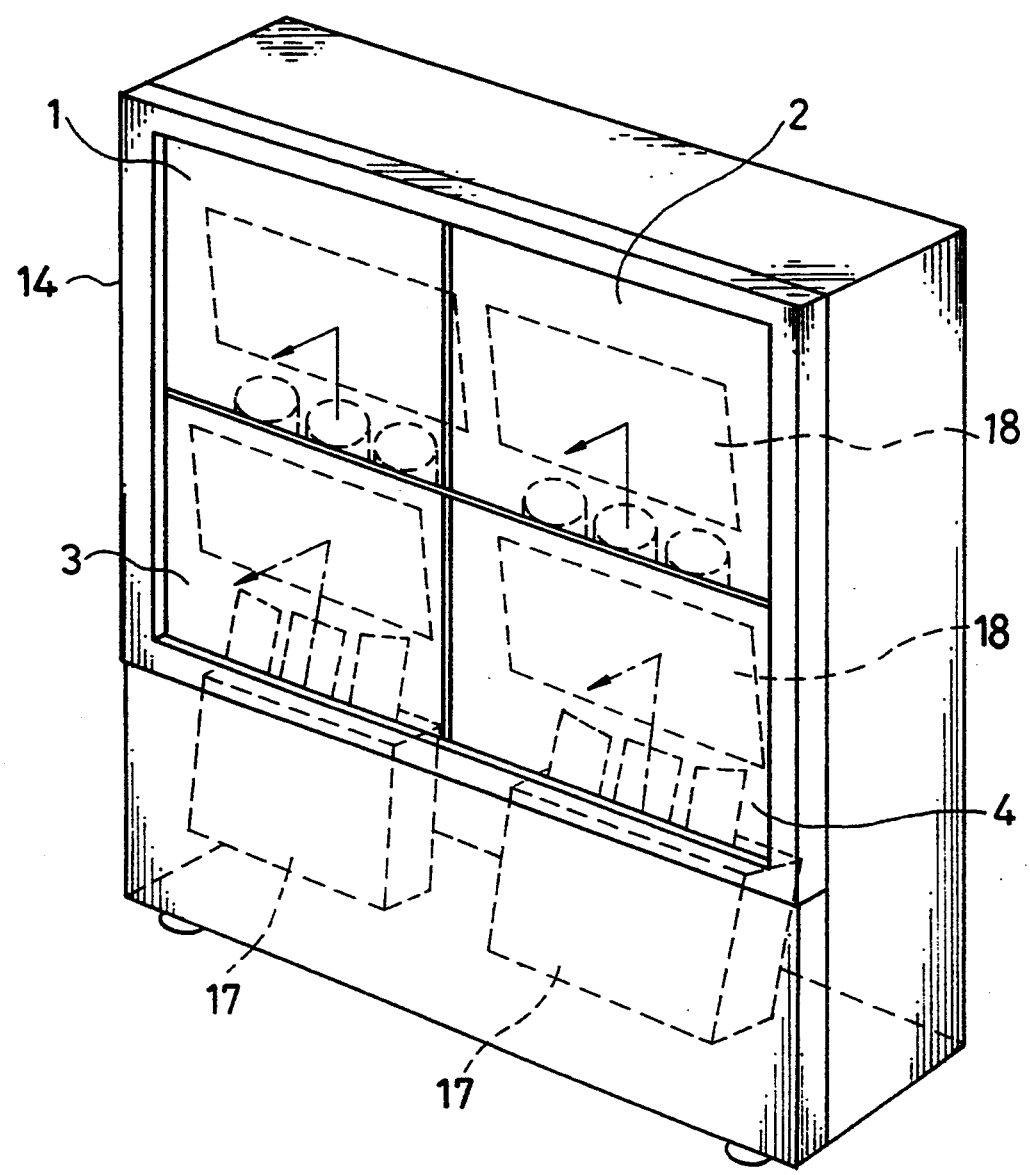
FIG. 12 is a perspective view showing the whole structure of a large-size picture display system.

FIG. 12 is a perspective view of the large-size picture display apparatus wherein the screen unit built in accordance with the foregoing preferred embodiment of the present invention and supported by the ornamental frame 14 is assembled into the apparatus as an essential component. In FIG. 12, each of the unit projectors 17 and each of the reflection mirrors 18 are depicted by the hypothetical broken lines.

Figure 13A:
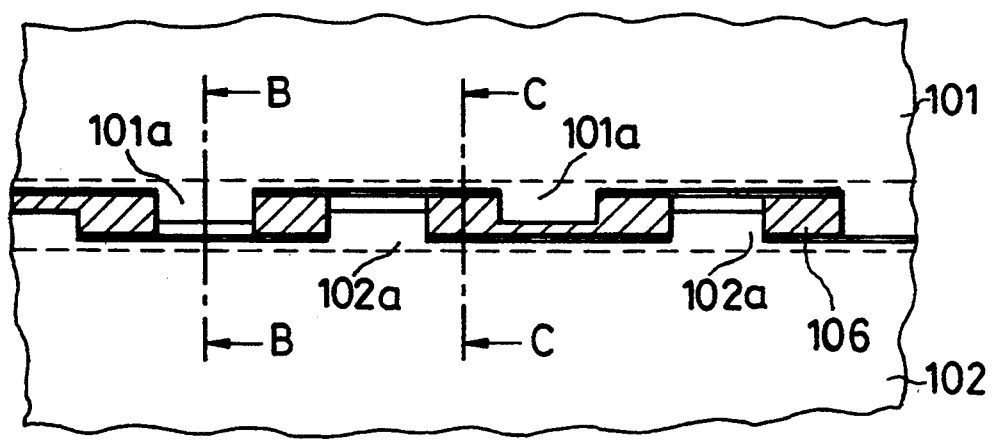
FIG. 13A is a partly cross-section front view showing the screen unit built in accordance with another embodiment of the present invention.
Figure 13B:
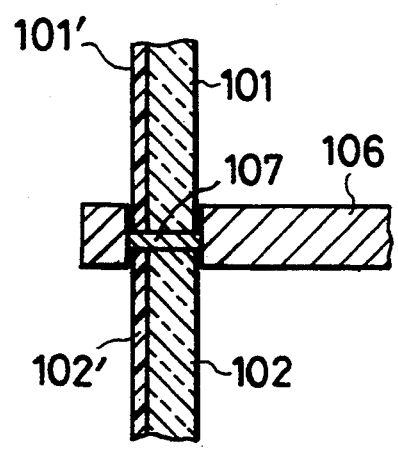
FIG. 13B is a side cross-sectional view of the screen unit shown in FIG. 13A, cut along the plane B—B of FIG. 13A.

FIG. 13A is a partly cross-section front view showing a joining part of the adjacent rear projection screen panels 101 and 102 and the cross member 103 of the screen unit built in accordance with another embodiment of the present invention. FIG. 13B is a side cross-sectional view of the screen unit shown in FIG. 13A, cut along the plane B—B of FIG. 13A; and FIG. 13C is a side cross-sectional view of the screen unit shown in FIG. 13A, cut along the plane C—C of FIG. 13A.

Figure 13C:
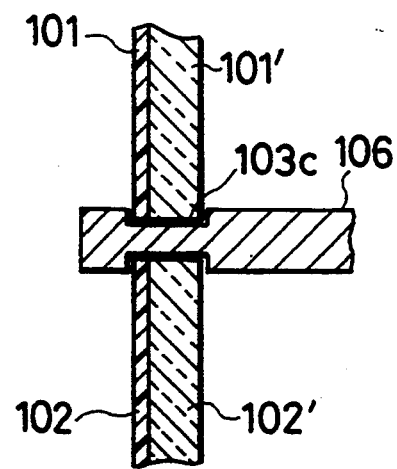
FIG. 13C is a side cross-sectional view of the screen unit shown in FIG. 13A, cut along the plane C—C of FIG. 13A.

In the embodiment shown in FIGS. 13A, 13B and 13C, each of the tenons 101a and 102a on the joining edges of the screen panel 101 and 102 is configured to have a much smaller width than the space between the tenons. And, the row of said tenons of one of said screen panel 101 are staggered along the joining line with respect to the row of said tenons of the adjacent screen panel 102. By being configures as above-mentioned, the tenons in the first-mentioned row can be accommodated by the spaces between the tenons in the second mentioned row on the other of said screen panels and connected to the bottom of said space through the adhesive layer 107, for forming a multiple mortise-and-tenon joint between the adjacent screen panels.

The side cross-sectional view of FIG. 13B, cut along the plane C—C of FIG. 13A illustrates the structure of the part whereat the tenon 101a of the first mentioned screen panel 101 is directly connected to the bottom of the space formed between the tenons 102a of the second mentioned screen panel 102 with the adhesive layer 107 through the mortises 106a of the beam 108. On the other hand, the side cross-sectional view of FIG. 13C shows a view cut along the plane C—C of FIG. 13A. As shown in FIG. 13A, the part whereat the space between tenons of the first mentioned screen panel 101 is facing with the space formed between the tenons of the second mentioned screen panel 102; and both spaces are engaging with the grooves 108c of cross member 106 which connects its mortises.

In the illustrated case, the space between the tenons are configured to have a much larger width than that of the tenon. The adhesion area can however be large enough for securing a sufficient joining strength similarly to the foregoing embodiment shown in FIG. 1 through FIG. 12.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A rear projection screen unit in a large-size picture display system, composed by combining a plurality of rear projection screen panels arranged in a lattice square with at least one ordinate beam and at least one abscissa beam disposed between the adjacent screen panels, wherein each of said screen panels intersects with each of said beams which themselves intersect with each other to form the lattice square, comprising;
   a plurality of tenons provided on the side edges of each of said screen panels that face said beams, and arranged in a row;
   a plurality of mortises provided in a row on both surfaces of said beams that face said side edges of each of said screen panels, and arranged in a row that coincides with said row of said tenons; and
   at least one reflection preventing colored layers deposited on the surfaces of said side edges of said screen panels including said tenons that face said beams; wherein, each of said mortises accommodates each of said tenons of said screen panels that fits in each of said mortises for forming a multiple mortise-and-tenon joint between said screen panels and ordinate and abscissa beams.

2. The rear projection screen unit in accordance with claim 1, wherein each of said beams has a thickness which is approximately the same as that of twice the heights of said tenons plus the thickness of said reflection preventing colored layers, and each of the tops of said tenons on the side edges of said screen panels is deposited with an adhesive layer to connect itself with the corresponding top of each of the tenons on the side edges of said screen panels.

3. The rear projection screen unit in accordance with claim 1, wherein each of said beams is made of a material having a coefficient of thermal expansion substantially the same as that of said screen panels.

4. The rear projection screen unit in accordance with claim 1, wherein each of said ordinate and abscissa beams has at least one indent of the width and depth sufficient for accommodating the intersecting beams at similarly indented spot, and both of said ordinate and abscissa beams form a lattice structure when combined together by interlocking joint.

5. The rear projection screen unit in accordance with claim 1, wherein each of said screen panels comprises; a laminated body composed of a lenticular lens sheet and a frensnel lens sheet.

6. The rear projection screen unit in accordance with claim 1, wherein each of said beams is made of a metal and has a thickness smaller than twice the heights of said tenons plus the thickness of said reflection preventing colored layers.

7. The rear projection screen unit in accordance with any of claims 1, 2, 3, 4, 5 and 6, further comprising a U-cross section outer frame member which encompasses said lattice square composed of said screen panels and said ordinate and abscissa beams.

8. The rear projection screen unit in accordance with claim 7, wherein the outer edges of said screen panels are closely fit in the inward grooves formed along said U-cross section outer frame member.

9. The rear projection screen unit in accordance with claim 7, further comprising at least one resilient material member placed in the inward grooves formed along said U-cross-section outer frame member, wherein said screen panels are urged inwards by said resilient member that gives a stress on said screen panels toward the center of the lattice square.

10. The rear projection screen unit in accordance with claim 9, wherein said resilient member is a metal leaf spring.

11. The rear projection screen unit in accordance with claim 9, wherein said resilient member is made of rubber or rubbery resinous material.

12. The rear projection screen unit in accordance with claim 7, 8, 9 or 10, further comprising a reflection preventing colored layer deposited on the bottom of the inside surfaces of said inward groove of said outer frame member.

13. The rear projection screen unit in accordance with claim 1, wherein the width of each tenons is much smaller than the space between the tenons, and the row of said tenons of one of said screen panels are staggered with respect to the row of said tenons of the adjacent screen panels in a manner that the tenons in the first-mentioned row can be accommodated by the row of the spaces between the tenons in the second mentioned row on the other of said screen panels, for forming a multiple mortise-and-tenon joint between adjacent said screen panels and sandwiching said ordinate and abscissa beams, through said mortises provided on said beams whose thickness is approximately the same as the height of said tenons.

14. A method for forming a rear projection screen unit panels in a large-size picture display apparatus composed by combining a plurality of rear projection screen panels arranged in a lattice square with at least one ordinate beam and at least one abscissa beam disposed between the adjacent screen panels, wherein each of said screen panels intersects with each of said beams which themselves intersect with each other: comprising;

providing a row of a plurality of tenons on the side edges of each of said screen panels that face said beams;

providing a plurality of mortises on both surfaces of said beams that face said side edges of each of said screen panels, disposed in a row that coincides with said row of said tenons;

depositing at least one reflection preventing colored layers on said side edges including said tenons of said screen panels that face said beams;

depositing an adhesive layer on each of the tops of said tenons on said screen panels; and assembling said screen panels and said beams in the lattice square by inserting said tenons into said mortises for forming a multiple mortise-and-tenon joint between said screen panels and ordinate and abscissa beams.

15. The method in accordance with claim 14, wherein the widths of the mortises nearest to a point whereat both the ordinate and abscissa beams intersect with each other are smaller than those of the rest of the mortises.

16. Beams for assembling a rear projection screen unit in a large-size picture display apparatus, composed by arranging a plurality of rear projection screen panels which has, on their joining edges, a row of a plurality of tenons with adhesive layers on their tops, in a lattice square, comprising:

at least one ordinate beam having a row of mortises, each of which is adapted to accommodate each of said tenons; and at least one abscissa beam having a row of mortises, each of which is adapted to accommodate each of said tenons.

wherein; both of said beams have at least one indent at which one of said beams intersects with the other by fitting them in the indent of the counterpart.

17. The beams in accordance with claim 16, for supporting said screen panels, composed by laminating a lenticular lens sheet and a frensnel lens sheet, wherein; both of the ordinate and abscissa beams have a groove which connects said mortises in the rows, having a sufficient width and depth for supporting the joining edges of the screen panels.

18. The beams in accordance with claim 16, for supporting said screen panels, further comprising; at least one adhesive layer deposited on the part that faces with each of the joining edges of said screen panels.

19. The beams in accordance with claim 16, for supporting said screen panels, further composing; at least one reflection preventing colored layer deposited on the part that faces with each of the joining edges of said screen panels.

20. The beams in accordance with claim 16, made of a metal and having a thickness smaller than twice the heights of said tenons.

21. The beams in accordance with claim 16, made of a material having a coefficient of thermal expansion which is approximately the same as that of the screen panels.

* * * * *